(12) United States Patent
Andris

(10) Patent No.: US 8,606,444 B2
(45) Date of Patent: Dec. 10, 2013

(54) MACHINE AND POWER SYSTEM WITH ELECTRICAL ENERGY STORAGE DEVICE

(75) Inventor: Eric M. Andris, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 420 days.

(21) Appl. No.: 12/981,398

(22) Filed: Dec. 29, 2010

(65) Prior Publication Data

US 2012/0173059 A1 Jul. 5, 2012

(51) Int. Cl.

| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
USPC .............. 701/22; 701/1; 180/53.5; 180/65.1; 180/65.21; 180/65.24; 180/65.265

(58) Field of Classification Search
USPC .............. 701/50, 1, 22, 36; 700/22, 286, 291, 700/297, 298
See application file for complete search history.

(56) References Cited

U.S. PATENT DOCUMENTS

| | | | |
|---|---|---|---|
| 4,553,196 A | | 11/1985 | Tokuyama et al. |
| 4,564,799 A | * | 1/1986 | Iwaki et al. .................. 320/101 |
| 4,788,486 A | * | 11/1988 | Mashino et al. ............. 320/123 |
| 4,992,672 A | * | 2/1991 | Norton .......................... 307/10.1 |
| 5,488,283 A | * | 1/1996 | Dougherty et al. .......... 307/10.1 |
| 5,689,174 A | * | 11/1997 | Pacheco, Sr. .................... 322/16 |
| 6,018,694 A | * | 1/2000 | Egami et al. ................... 701/102 |
| 6,049,198 A | * | 4/2000 | Schenk ............................ 322/90 |
| 6,211,681 B1 | * | 4/2001 | Kagawa et al. ................ 324/426 |
| 6,289,180 B1 | | 9/2001 | Jeng |
| 6,292,218 B1 | | 9/2001 | Parulski et al. |
| 6,321,707 B1 | * | 11/2001 | Dunn .......................... 123/179.3 |
| 6,666,022 B1 | * | 12/2003 | Yoshimatsu et al. ............ 60/413 |
| 6,674,247 B1 | | 1/2004 | Mead et al. |
| 7,086,226 B2 | * | 8/2006 | Oguri .............................. 60/414 |
| 7,148,658 B2 | | 12/2006 | Yu |
| 7,236,893 B2 | * | 6/2007 | Gross et al. ...................... 702/57 |

(Continued)

FOREIGN PATENT DOCUMENTS

| | | |
|---|---|---|
| JP | 11122824 | 4/1999 |
| JP | 11164494 | 6/1999 |

OTHER PUBLICATIONS

U.S. Appl. No. 12/981,374, filed Dec. 29, 2010.
U.S. Appl. No. 12/981,384, filed Dec. 29, 2010.

*Primary Examiner* — Bhavesh V Amin
(74) *Attorney, Agent, or Firm* — Finnegan, Henderson, Farabow, Garrett & Dunner LLP

(57) ABSTRACT

A machine includes a power system having a prime mover drivingly connected to an electric generator, a power line operably connected to the electric generator, and a first electrical energy storage device operable to exchange electricity with the power line. The power system may also include a second electrical energy storage device and power-system controls. The power-system controls may include a power regulator and at least one information processor configured to receive information related to at least one operating parameter of the power system and control the power regulator based on the received information, including selectively controlling the power regulator to receive electricity from the second electrical energy storage device and supply the electricity to the first electrical energy storage device.

17 Claims, 3 Drawing Sheets

(56) References Cited

U.S. PATENT DOCUMENTS

| | | | |
|---|---|---|---|
| 7,279,801 B2 * | 10/2007 | Kagoshima | 290/40 C |
| 7,385,374 B2 * | 6/2008 | Frantz et al. | 320/138 |
| 7,459,914 B2 | 12/2008 | Lindsey et al. | |
| 7,525,206 B2 * | 4/2009 | Kagoshima et al. | 290/40 C |
| 7,560,905 B2 | 7/2009 | Lafontaine | |
| 7,602,145 B2 * | 10/2009 | Renda | 320/119 |
| 7,667,611 B2 * | 2/2010 | Lindsey et al. | 340/662 |
| 7,764,067 B2 | 7/2010 | Lindsey | |
| 7,869,913 B2 * | 1/2011 | Aoyama et al. | 701/22 |
| 7,977,813 B2 * | 7/2011 | Bakken et al. | 307/10.1 |
| 8,333,172 B2 * | 12/2012 | Andris et al. | 123/41.44 |
| 2003/0067221 A1 | 4/2003 | Disser et al. | 307/10.1 |
| 2003/0209375 A1 * | 11/2003 | Suzuki et al. | 180/65.3 |
| 2004/0257047 A1 * | 12/2004 | Frantz et al. | 320/138 |
| 2007/0120694 A1 * | 5/2007 | Lindsey et al. | 340/662 |
| 2007/0140670 A1 * | 6/2007 | DeDona et al. | 388/825 |
| 2009/0001993 A1 | 1/2009 | Lindsey et al. | |
| 2009/0033357 A1 | 2/2009 | Lindsey et al. | |
| 2009/0071736 A1 * | 3/2009 | Mori et al. | 180/65.285 |
| 2009/0085575 A1 | 4/2009 | Lindsey et al. | |
| 2009/0085759 A1 | 4/2009 | Lindsey et al. | |
| 2009/0107743 A1 * | 4/2009 | Alston et al. | 180/65.21 |
| 2009/0127930 A1 | 5/2009 | Senda | |
| 2009/0140698 A1 * | 6/2009 | Eberhard et al. | 320/152 |
| 2009/0140700 A1 * | 6/2009 | Eberhard et al. | 320/162 |
| 2009/0140745 A1 | 6/2009 | Williams et al. | |
| 2009/0140748 A1 | 6/2009 | Lindsey et al. | |
| 2009/0143929 A1 * | 6/2009 | Eberhard et al. | 701/22 |
| 2009/0167254 A1 * | 7/2009 | Eberhard et al. | 320/152 |
| 2009/0216688 A1 * | 8/2009 | Kelty et al. | 705/418 |
| 2009/0219656 A1 | 9/2009 | Lindsey | |
| 2009/0251154 A1 | 10/2009 | Lindsey | |
| 2010/0076636 A1 | 3/2010 | Ichikawa | |
| 2010/0155036 A1 | 6/2010 | Andris et al. | |
| 2011/0187316 A1 * | 8/2011 | Ranganathan et al. | 320/107 |
| 2012/0153884 A1 * | 6/2012 | Lindsey et al. | 318/500 |

* cited by examiner

MACHINE AND POWER SYSTEM WITH ELECTRICAL ENERGY STORAGE DEVICE

TECHNICAL FIELD

The present disclosure relates to machines with power systems and, more particularly, to machines with power systems that include at least one electrical energy storage device.

BACKGROUND

Many machines include a power system with a prime mover (such as an engine) that drives an electric generator to supply electricity to one or more electrical power loads to perform one or more tasks. The electric power loads of such a machine may include, for example, one or more electric motors that propel the machine or drive implements or other devices of the machine. The power systems of some such machines may also include one or more electrical energy storage devices (such as batteries or capacitors) for supplying power to the one or more electric loads, either in combination with or instead of power supplied from the electric generator driven by the prime mover. Such electrical energy storage devices sometimes become discharged and require recharging before they can supply electricity to the electrical power loads of the machine. When the prime mover is driving the electric generator to generate electricity, the electrical energy storage device can be charged with electricity from the generator. However, during times when the prime mover is not driving the electric generator, the electrical energy storage device cannot be charged with electricity from the generator.

Published U.S. Patent Application No. 2010/0076636 A1 to Ichikawa ("the '636 application") discloses a system with provisions for charging a battery on a machine when an engine and electric generator of the machine are not generating electricity. Specifically, the system of the '636 application includes a charger that can be connected to a supply of power off-board the machine, such as a commercial supply of 100 v or 200 v AC power, to charge the battery.

Although the '636 patent discloses a system with a charger that can connect to commercial power off-board the machine to charge a battery, certain disadvantages may persist. For example, in many circumstances, there may not be a readily available source of off-board commercial power to connect to the charger and charge the battery.

The machine, power system, and methods of the present disclosure solve one or more of the problems set forth above.

SUMMARY

One disclosed embodiment relates to a machine that includes a power system. The power system may include a prime mover drivingly connected to an electric generator. The power system may also include a power line operably connected to the electric generator. Additionally, the power system may include a first electrical energy storage device operable to exchange electricity with the power line. The power system may also include a second electrical energy storage device. The power system may further include power-system controls. The power-system controls may include a first power regulator. The power-system controls may also include at least one information processor configured to receive information related to at least one operating parameter of the power system and control the first power regulator based on the received information, including selectively controlling the first power regulator to receive electricity from the second electrical energy storage device and supply the electricity to the first electrical energy storage device.

Another embodiment relates to a method of operating a power system of a machine. The power system may include a prime mover, an electric generator drivingly connected to the prime mover, a power line, a first electrical energy storage device, a second electrical energy storage device, and a power regulator. The method may include selectively supplying electricity to the power line by operating the engine to drive the electric generator and supply electricity from the electric generator to the power line. The method may also include selectively operating the power regulator to receive electricity from the second electrical energy storage device and supply electricity to the first electrical energy storage device, including maintaining the electric current magnitude of the electricity supplied from the first power regulator to the first electrical energy storage device below a first current value. The method may also include selectively supplying electricity from the power line to the first electrical energy storage device at an electric current magnitude greater than the first current value.

A further disclosed embodiment relates to a machine. The machine may include a frame, a moveable component connected to the frame, and a power system. The power system may include an electric motor drivingly connected to the moveable component and operable to move the moveable component relative to the frame. The power system may also include an engine drivingly connected to an electric generator. The power system may additionally include a power line connected between the electric generator and the electric motor, the power line being operable to transmit electricity between the electric generator and the electric motor. The power system may also include a first electrical energy storage device operable to exchange electricity with the power line. Additionally, the power system may include a second electrical energy storage device and a power regulator. The power system may also include one or more information processors configured to receive information relative to at least one operating parameter of the machine and control the power regulator based on the received information, including selectively controlling the power regulator to receive electricity from the second electrical energy storage device at a first voltage and supply the electricity to the first electrical energy storage device at a second voltage.

DETAILED DESCRIPTION

Figure 1:
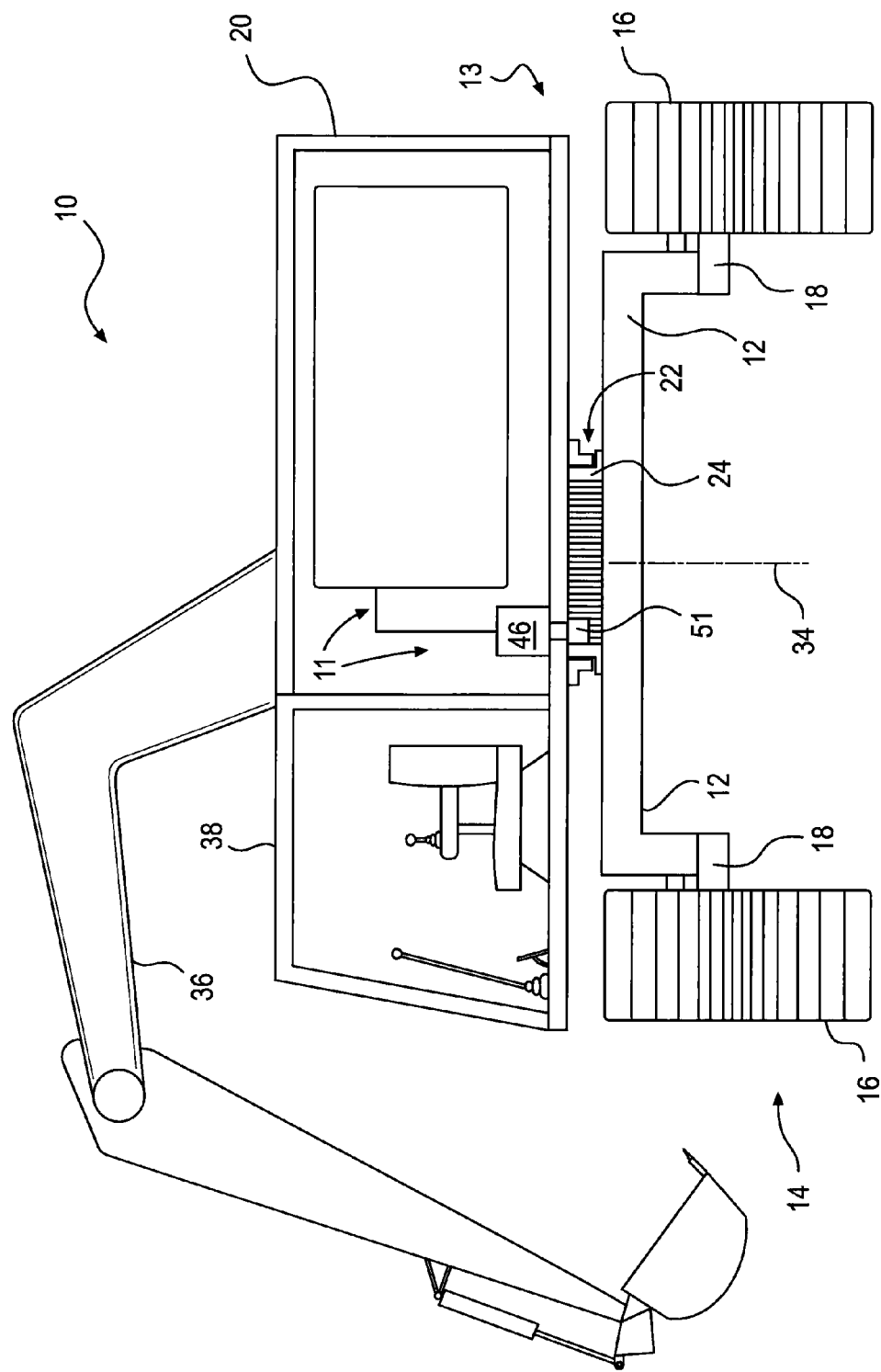
FIG. 1 shows one embodiment of a machine having a power system according to the present disclosure.
Figure 2:
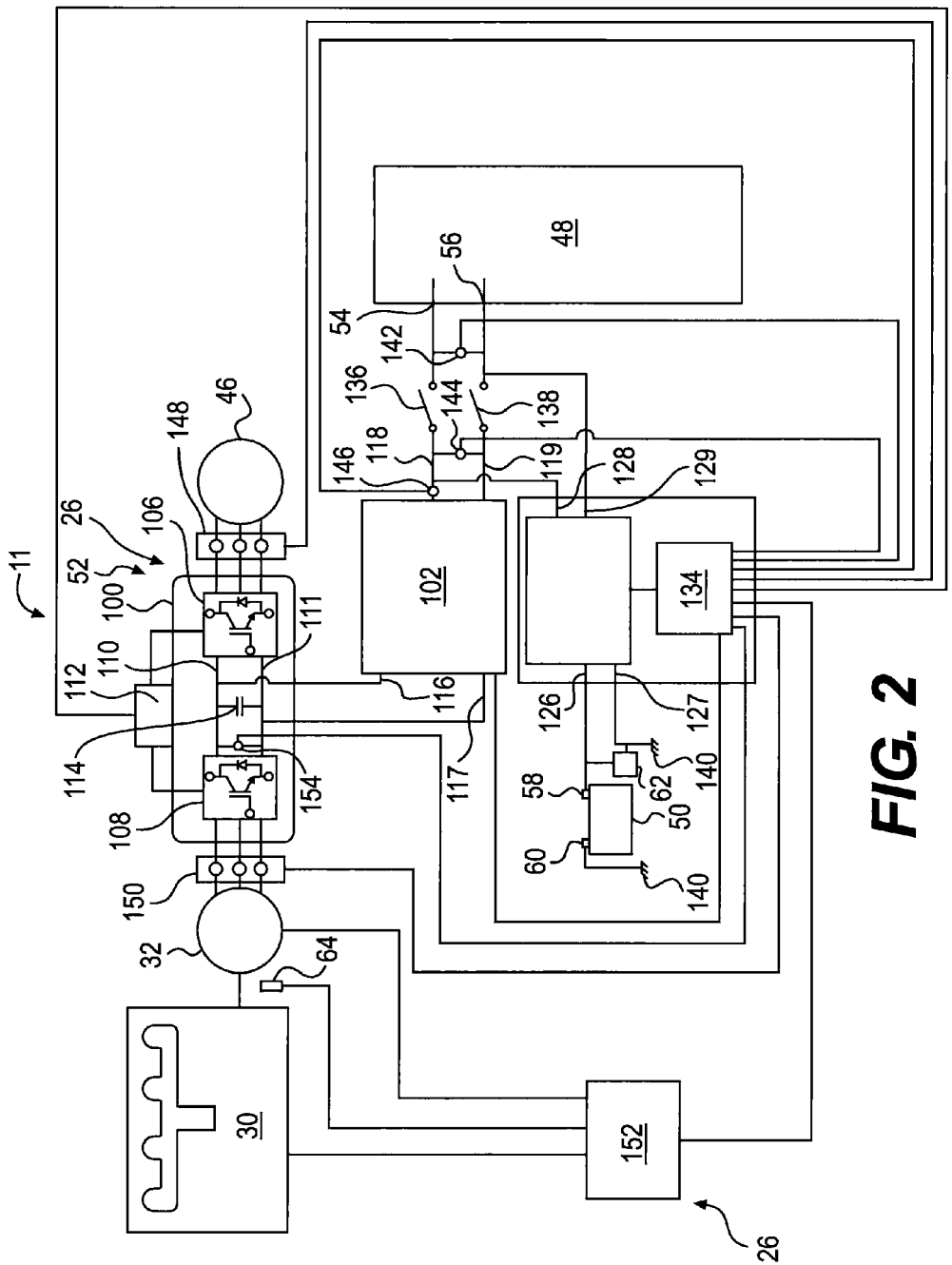
FIG. 2 shows one embodiment of a power system according to the present disclosure in more detail.

FIGS. 1 and 2 show a machine 10, a power system 11, and various components thereof according to the present disclosure. Machine 10 may be any type of machine that employs power to perform one or more tasks. For example, machine 10 may be a mobile machine configured to transport or move people, goods, or other matter or objects. Additionally, or alternatively, machine 10 may be configured to perform a variety of other operations associated with a commercial or industrial pursuit, such as mining, construction, energy exploration and/or generation, manufacturing, transportation, and agriculture.

As shown in FIG. 1, in some embodiments, machine 10 may be an excavator configured for digging. Machine 10 may include a chassis 13 to which other components of machine 10 are attached. In some embodiments, chassis 13 may be constructed in part or in whole from electrically conductive materials, such as steel, cast iron, aluminum, and/or other electrically conductive metals. In the example shown in FIG. 1, chassis 13 may include an undercarriage 14 and a superstructure 20. Undercarriage 14 may include a frame 12. In some embodiments, machine 10 may be a mobile machine, and undercarriage 14 may include one or more propulsion devices 16 for propelling machine 10. Propulsion devices 16 may be any type of device configured to propel machine 10. For example, as FIG. 1 shows, propulsion devices 16 may be track units. Alternatively, propulsion devices 16 may be wheels or other types of devices operable to propel machine 10. Undercarriage 14 may also include one or more components for driving propulsion devices 16. For example, undercarriage 14 may include drive motors 18 for driving propulsion devices 16. Drive motors 18 may be electric motors or hydraulic motors.

Superstructure 20 may be suspended from frame 12. In some embodiments superstructure 20 may be suspended from frame 12 by a pivot system 22. Pivot system 22 may include a swing bearing 24 and an electric motor 46. Swing bearing 24 may include an inner race mounted to frame 12 and an outer race to which superstructure 20 mounts. Both the inner and outer race of swing bearing 24 may extend concentric to a vertical axis 34. The inner and outer race may be engaged to one another via rolling elements (not shown), such as ball bearings, in such a manner that the outer race and superstructure 20 may pivot around axis 34 relative to frame 12.

Electric motor 46 may be operable to rotate superstructure 20 and the outer race of swing bearing 24 around axis 34. Electric motor 46 may have a gear 51 mounted to its output shaft, and electric motor 46 may mount to superstructure 20 in a position such that gear 51 meshes with gear teeth on frame 12. Electric motor 46 may receive power to rotate superstructure 20 around axis 34 from various components of power system 11. Electric motor 46 may constitute one of many electrical power loads of power system 11.

Machine 10 may include various other components. For example, as FIG. 1 shows, machine 10 may include an implement 36. Implement 36 may be mounted to various parts of machine 10 and configured to perform various tasks. In some embodiments, implement 36 may be mounted to superstructure 20 and configured to perform digging. Machine 10 may also include an operator station 38 from which an individual can control one or more aspects of the operation of machine 10. Operator station 38 may also be mounted to superstructure 20.

FIG. 2 shows power system 11 in greater detail. Power system 11 may include power-system controls 26 and various components operable to provide power to perform various tasks. In some embodiments, power system 11 may be a hybrid-electric power system. In addition to power-system controls 26, power system 11 may include electric motor 46, a prime mover 30, an electric motor/generator 32, a first electrical energy storage device 48, a second electrical energy storage device 50, and a power-transmission system 52. As used herein, the term "electric motor/generator" refers to any electrical device operable to operate as an electric motor when receiving electrical power and/or to operate as an electric generator when being mechanically driven.

Prime mover 30 may be any type of device configured to produce mechanical power to drive electric motor/generator 32. For example, prime mover 30 may be a diesel engine, a gasoline engine, a gaseous fuel-powered engine, or any other type of component operable to produce mechanical power.

Electric motor/generator 32 may be any type of component operable to generate electricity with mechanical power received from prime mover 30. Electric motor/generator 32 may also be operable to receive electricity and operate as an electric motor to drive prime mover 30 for a number of purposes. Electric motor 46 may be any type of component operable to receive electricity from power-transmission system 52 and operate as an electric motor. Each of electric motor/generator 32 and electric motor 46 may be, for example, any of a permanent-magnet electric machine, a switched reluctance electric machine, a DC electric machine, an induction-type machine or any other type of electric machine known in the art.

Electrical energy storage device 48 may be any type of device operable to store electrical energy and exchange electricity with (i.e., receive electricity from and transmit electricity to) power-transmission system 52. For example, electrical energy storage device 48 may include one or more batteries and/or one or more capacitors. Electrical energy storage device 48 may include a positive terminal 54 and a negative terminal 56. Electrical energy storage device 48 may be electrically isolated from the chassis 13 of machine 13. Electrical energy storage device 48 may include one or more storage cells (not shown) electrically connected to positive and negative terminals 54, 56. In some embodiments, electrical energy storage device 48 may include multiple storage cells electrically connected in series and/or parallel to positive and negative terminals 54, 56.

Electrical energy storage device 48 may also include various other electrical components connected to terminals 54, 56 and/or the storage cells. For example, in some embodiments where electrical energy storage device 48 includes multiple energy storage cells connected to one another, electrical energy storage device 48 may include one or more circuits for allowing the flow of electricity around one or more cells during charging and/or discharging of electrical energy storage device 48. These and other components of electrical energy storage device 48 may be able to carry only limited current in certain circumstances, such as during charging of electrical energy storage device 48 in order to balance the charge of the cells in circumstances where the relative charge levels of its storage cells has become imbalanced.

Electrical energy storage device 48 may serve as the primary electrical energy storage for power system 11. Accordingly, electrical energy storage device 48 may have a large energy storage capacity. Additionally, electrical energy storage device 48 may have a relatively high nominal voltage rating, such as approximately 350 volts.

Electrical energy storage device 50 may also be any type of device operable to store electrical energy and exchange electricity with (i.e., receive electricity from and transmit electricity to) power-transmission system 52. Like electrical energy storage device 48, electrical energy storage device 50 may include one or more batteries and/or one or more capacitors. Electrical energy storage device 50 may include a positive terminal 58 and a negative terminal 60. In some embodiments, one of terminals 58, 60 may be electrically connected to chassis 13, so that the voltage of the terminal 58, 60 is chassis referenced. For example, negative terminal 60 may be electrically connected to chassis 13 via an electrical ground 140. Electrical energy storage device 50 may serve as a secondary electrical energy store of power system 11. Additionally, electrical energy storage device 50 may have a significantly lower nominal voltage rating than energy storage device 48. For example, electrical energy storage device 50 may have a nominal voltage rating of approximately 12 volts or approximately 24 volts.

Power-transmission system 52 may include an inverter 100, a power regulator 102, a power regulator 104, and various electrical connectors, such as electric lines and/or electric switches connecting these devices. Inverter may 100 include a power electronics unit 106, a power electronics unit 108, power lines 110, 111, a bulk capacitor 114, and a controller 112. Power electronics unit 106 may be operable to regulate a flow of power between electric motor 46 and power lines 110, 111. Power electronics module 106 may also be operable to convert the form of electricity flowing between electric motor 46 and power lines 110, 111. For example, power electronics unit 106 may be operable to convert between alternating electric current at electric motor 46 and direct current at power lines 110, 111. Power electronics module 108 may similarly be operable to regulate a flow of power between electric motor/generator 32 and power lines 110, 111. Power electronics module 108 may also be able to convert the form of electricity flowing between electric motor/generator 32 and power lines 110, 111, such as converting between alternating current electricity at electric motor/generator 32 and direct current electricity at power lines 110, 111. Power electronics modules 106-108 may include various types of controllable electric components for regulating and/or converting electrical power, including, but not limited to SCRs (silicon controller rectifiers), GTOs (gate turn-offs), IGBTs (insulated gate bipolar transistors), and FETs (field-effect transistors). Bulk capacitor 114 may be connected between power lines 110, 111 and serve to smooth out any fluctuations in voltage across power lines 110, 111. This configuration of inverter 100 may allow exchange of electricity between electric motor/generator 32 and electric motor 46 via power electronics modules 106, 108 and power lines 110, 111.

Controller 112 may be operatively connected to power electronics modules 106, 108, and controller 112 may be configured (e.g., programmed) to control one or more aspects of the operation of power electronics modules 106, 108. In some embodiments, controller 112 may include, for example, one or more microprocessors and/or one or more memory devices. By controlling power electronics modules 106, 108, controller 112 may be operable to control the voltage on power lines 110, 111, as well as the magnitude of current flowing between power lines 110, 111, electric motor 46, and electric motor/generator 32. In some embodiments, controller 112 may control power electronics modules to maintain voltage on power lines 110, 111 higher than the nominal voltage rating of electrical energy storage device 48. For example, where the nominal voltage rating of electrical energy storage device 48 is about 350 volts, controller 112 may operate power electronics modules 106, 108 to maintain the voltage on power lines at about 650 volts.

Power regulator 102 may include input/output terminals 116, 117, 118, 119. Power regulator 102 may have any configuration that allows it to regulate one or more aspects of electricity exchanged between terminals 116, 117 and terminals 118, 119. Power regulator 102 may, for example, be operable to control whether electricity is exchanged between terminals 116, 117 and terminals 118, 119. Power regulator 102 may also be configured to control which direction electricity flows between terminals 116, 117 and terminals 118, 119, i.e., whether electricity flows from terminals 116, 117 to terminals 118, 119, or vice-a-versa. Power regulator 102 may exchange electricity in various forms. In some embodiments, power regulator 102 may be configured to receive and/or supply direct current electricity at terminals 116, 117, 118, 119. Power regulator 102 may also be operable to control the voltage at each of terminals 116, 117, 118, 119 as well as the magnitude of electric current flowing at each of terminals 116, 117, 118, 119. For example, power regulator 102 may be operable to change the electricity transmitted between terminals 116, 117 and terminals 118, 119 from one voltage (such as approximately 650 volts) of direct current electricity at terminals 116, 117 to another voltage (such as approximately 350 volts) of direct current electricity at terminals 118, 119. As discussed further below, power regulator 102 may be controllable by one or more other component(s) of power system 11, so that those other components may control how power regulator 102 controls the exchange of electricity between terminals 116, 117 and terminals 118, 119. Power regulator 102 may include any suitable configuration of components that allows it to provide the above-discussed functionality.

Power regulator 104 may include input/output terminals 126, 127, 128, 129. Power regulator 104 may have any configuration that allows it to regulate one or more aspects of electricity exchanged between terminals 126, 127 and terminals 128, 129. Power regulator 104 may, for example, be operable to control whether electricity is exchanged between terminals 126, 127 and terminals 128, 129. Power regulator 104 may exchange electricity in various forms. In some embodiments, power regulator 104 may be configured to receive and/or supply direct current electricity at terminals 126, 127, 128, 129. Power regulator 104 may also be operable to control the voltage at each of terminals 126, 127, 128, 129 as well as the magnitude of electric current flowing at each of terminals 126, 127, 128, 129. For example, power regulator 104 may be operable to change the electricity transmitted between terminals 126, 127 and terminals 128, 129 from one voltage (such as approximately 12 or 24 volts) of direct current electricity at terminals 126, 127 to another voltage (such as approximately 350 volts) of direct current electricity at terminals 128, 129.

Power regulator 104 may be a unidirectional or bidirectional power regulator. In embodiments where power regulator 104 is a unidirectional power regulator, power regulator 104 may be operable to transmit electricity in only one direction between terminals 126, 127 and terminals 128, 129. For example, in some embodiments, power regulator 104 may be operable to transmit electricity from terminals 126, 127 to terminals 128, 129 but not in the opposite direction. Conversely, in embodiments where power regulator 104 is a bidirectional power regulator, power regulator 104 may be configured to control which direction electricity flows between terminals 126, 127 and terminals 128, 129, i.e., whether electricity flows from terminals 116, 117 to terminals 118, 119, or vice-a-versa.

Power regulator 104 may include a controller 134 configured (e.g., programmed) to control the foregoing aspects of how power regulator 104 controls the exchange of electricity between its terminals 126, 127, 128, 129. Controller 134 may have any configuration allowing it to perform such control of power regulator 104. In some embodiments, controller 134 may include one or more microprocessors and/or one or more memory devices. Controller 134 may also be operatively connected to power regulator 102 and controller 112 of inverter 100, so that controller 134 may monitor and/or control one or more aspects of the operation of power regulator 102 and inverter 100. As discussed further below, controller 134 and power regulator 104 may be operatively connected to other components of power-system controls 26, so that those other components may provide information to and/or control one or more aspects of how controller 134 controls power regulator 104, power regulator 102, and inverter 100. Power regulator 104 may include any suitable configuration of components that allows it to provide the above-discussed functionality.

In some embodiments, power regulator 104 may be operable to control small quantities of electric current more precisely than power regulator 102. For example, power regulator 104 may be operable to provide stable, effective control of the current magnitude and voltage of electric currents measured in milliamps, whereas power regulator 102 may be configured to control much larger power levels, such as electric current magnitudes in the tens or hundreds of amps. Concomitantly, power regulator 102 may, in some embodiments, have a higher power capacity than power regulator 104. For example, power regulator 102 may have a power capacity of tens, hundreds, or thousands of times that of power regulator 104.

Inverter 100, power regulators 102, 104, electrical energy storage devices 48, 50, electric motor 46, and electric motor/generator 32 may be electrically connected to one another in various ways. As FIG. 2 shows, in some embodiments, terminals 116, 117 of power regulator 102 may be electrically connected to power lines 110, 111 of inverter 100. This may allow exchange of electricity between power regulator 102, electric motor 46, and electric motor/generator 32 via power lines 110, 111 of inverter 100.

Additionally, power-transmission system 52 may have provisions for connecting terminals 118, 119 of power regulator 102 directly or indirectly to each of power regulator 104, electrical energy storage device 48, and electrical energy storage device 50. Terminal 118 of power regulator 102 may, for example, be continuously electrically connected to terminal 128 of power regulator 104. Additionally, power-transmission system 52 may include a switching device 138 that is operable when closed to electrically connect terminal 119 of power regulator 102 to terminal 129 of power regulator 104. Thus, when switching device 138 is in the closed operating state such that terminals 118, 119 of power regulator 102 are electrically connected to terminals 128, 129 of power regulator 104, power regulators 102, 104 may exchange electricity between one another, and power regulator 102 may be indirectly connected to electrical energy storage device 50 through power regulator 104. Conversely, when switching device 138 is in its open operating state, power regulator 102 and power regulator 104 may be effectively electrically isolated from one another.

Switching device 138 may also be operable to electrically connect terminal 119 of power regulator 102 to negative terminal 56 of electrical energy storage device 48. Additionally, power-transmission system 52 may include a switching device 136 operable when in its closed operating state to electrically connect terminal 118 of power regulator 102 to positive terminal 54 of electrical energy storage device 48. Thus, when switching devices 136, 138 are in their closed operating states, power regulator 102 and electrical energy storage device 48 may exchange electricity between one another. Conversely, when either of switching devices 136, 138 is in an open operating state, electrical energy storage device 48 may be effectively electrically isolated from power regulator 102. Switching devices 136, 138 may be controlled by various other components of power-system controls 26. In some embodiments, switching devices 136, 138 may be controlled, for example, by controller 134.

Power-transmission system 52 may also be configured to allow exchange of electricity between power regulator 104 and electrical energy storage device 48. Terminal 129 of power regulator 104 may, for example, be continuously electrically connected to negative terminal 56 of electrical energy storage device 48. Additionally, as noted above, terminal 128 of power regulator 104 may be continuously electrically connected to terminal 118 of power regulator 102, and switching device 136 may be operable when in a closed operating state to electrically connect terminal 118 of power regulator 102 to positive terminal 54 of electrical energy storage device 48. Thus, when switching device 136 is in a closed operating state, power regulator 104 and electrical energy storage device 48 may exchange electricity between one another. Conversely, when switching device 136 is in an open operating state, power regulator 104 and electrical energy storage device 48 may be effectively electrically isolated from one another.

Power-transmission system 52 may also have provisions for transmitting electricity between electrical energy storage device 50 and power regulator 104. For example, terminal 126 of power regulator 104 may be continuously connected to positive terminal 58 of electrical energy storage device 50. Additionally, negative terminal 60 of electrical energy storage device 50 and terminal 127 of power regulator 104 may be electrically connected to a common electrical ground, 140, such as an electrically conductive portion of chassis 13 of machine 10.

The exemplary configuration of power-transmission system 52 shown in FIG. 2 may allow it to transmit electricity between electric motor/generator 32, electric motor 46, electrical energy storage device 48, and electrical energy storage device 50 in various ways through power regulators 102, 104. For example, when switching device 136 is in a closed operating state and switching device 138 is in an open operating state, power-transmission system 52 may transmit electricity between electrical energy storage device 50 and electrical energy storage device 48 via power regulator 104. When switching device 136 is in an open operating state and switching device 138 is in a closed operating state, power-transmission system 52 may transmit electricity between electrical energy storage device 50, electric motor/generator 32, and electric motor 46 via power regulators 102, 104. When both switching devices 136, 138 are closed, power-transmission system 52 may freely exchange electricity between electrical energy storage device 48, electrical energy storage device 50, electric motor/generator 32, and electric motor 46 through one or both of power regulators 102, 104.

In addition to those shown in FIG. 2, power system 11 may also include a number of other electrical loads and/or sources. For example, in addition to electric motor 46, power system 11 may include various other large, high-voltage electrical loads, such as drive motors 18, connected to power lines 110, 111 of inverter 100. Additionally, power system 11 may have various electrical loads 62 connected to electrical energy storage device 50, which may be smaller, low-voltage loads, such as lights, gauges, sensors, fan motors, and the like. Such loads 62 may be connected to electrical energy storage device 50 through a low-voltage power-transmission system, separate from power-transmission system 52. Additionally, power system 11 may include one or more electricity sources for charging electrical energy storage device 50 and/or powering any smaller, low-voltage loads connected thereto. For example, power system 11 may include a conventional alternator (not shown) driven by prime mover 30. Electrical power loads 62, the low-voltage power-transmission system connecting them to electrical energy storage device 50, and any other electrical energy sources connected to electrical energy storage device 50 and electrical power loads 62 may be electrically referenced to chassis 13, such as by connection to ground 140.

Power-system controls 26 may be configured to control charging and discharging of electrical storage devices 48, 50, operation of prime mover 30, operation of electric motor/generator 32, operation of electric motor 46, and transmission of electricity through power-transfer system 52 in connection with all of these tasks. Power-system controls 26 may include a number of the components already discussed, such as inverter 100, power regulator 102, power regulator 104, and switching devices 136, 138. To control the operation of these components, some embodiments of power-system controls 26 may include one or more other components. For example, as FIG. 2 shows, power-system controls 26 may include a controller 152 operably connected to controller 134 of power regulator 104. Controller 152 may also be operatively connected to prime mover 30, electric motor/generator 32, and electric motor 46 in a manner allowing controller 152 to monitor and/or control one or more aspects of the operation of these components. Based on various operating parameters of prime mover 30, electric motor/generator 32, electric motor 46, and/or other components of power system 11, controller 152 may perform high-level control of power system 11. In doing so, controller 152 may provide to controller 134 of power regulator 104 various target values for operation of power regulator 104, power regulator 102, inverter 100, the primary electrical energy storage device 48, the secondary electrical energy storage device 50, and/or other components of power system 11. For example, controller 152 may communicate to controller 134 target values for voltage and/or electric current in certain portions of power system 11, and controller 134 may control power regulator 104, power regulator 102, inverter 100, switching devices 136, 138 and/or other components of power system 11 to implement the target values. Controller 152 may include any suitable information processing device for controlling the components discussed above. In some embodiments, controller 152 may include one or more microprocessors and/or one or more memory devices programmed to control power system 11 in the manners discussed below.

Power-system controls 26 may also include components for monitoring various aspects of the operation of power system 11. For example, power-system controls 26 may include a voltage sensor 142 for sensing a voltage across terminals 54, 56 of electrical energy storage device 48, which may serve as an indication of a charge level of electrical energy storage device 48. Power-system controls 26 may also include a voltage sensor 144 for sensing a voltage across terminals 118, 119 of power regulator 102. Similarly, power-system controls 26 may include a voltage sensor 154 for sensing the voltage between power lines 110, 111. Additionally, power-system controls 26 may also include a current sensor for sensing a magnitude of electric current in terminal 118, current sensors 148 for sensing a magnitude of electric current flowing between inverter 100 and electric motor 46, and current sensors 150 for sensing a magnitude of electric current flowing between inverter 100 and electric motor/generator 32.

Power-system controls 26 may also include a position sensor 64 for sensing a rotational position of a shaft of electric motor/generator 32. Position sensor 64 may be any type of sensor operable to sense the position of the shaft of electric motor/generator 32. In some embodiments, position sensor 64 may be of a type such that the rotational position of the shaft of electric motor/generator 32 can be discerned from the signal generated by position sensor 64 only when the shaft of electric motor/generator 32 is rotated.

The sensors of power-system controls 26 may be communicatively linked to various components. For example, these sensors may be communicatively linked to controller 134 and/or controller 152, so that power-system controls 26 may monitor the parameters sensed by these sensors. Additionally, power-system controls 26 may include sensors for sensing various other aspects of the operation of power system 11, such as whether prime mover 30 is driving electric motor/generator 32 and whether electric motor/generator 32 is generating electricity. Controller 134 and/or controller 152 and/or other components of power-system controls 26 may also monitor these operating parameters.

Electrical energy storage device 48 and electrical energy storage device 50 may form part of two different branches or circuits of power system 11. As noted above, electrical energy storage device 48 may be electrically isolated from chassis 13 of machine 10, and electrical energy storage device 50 may be electrically referenced to chassis 13 by its connection to chassis 13 at ground 140. As also noted above, power loads 62 and various other electrical components connected to electrical energy storage device 50 may be electrically referenced to chassis 13 of machine 10, such as by connection to ground 140. On the other hand, like electrical energy storage device 48, power regulator 102, inverter 100, power lines 110, 111, electric motor/generator 32, and electric motor 46 may be electrically isolated from chassis 13 and, thus, from electrical energy storage device 50, electrical loads 62, and other chassis referenced electrical components. Thus, electrical energy storage device 50, electrical power loads 62, and other chassis referenced components may form part of one branch or circuit of power system 11, whereas electrical energy storage device 48, power regulator 102, inverter 100, power lines 110, 111, electric motor/generator 32, and electric motor 46 may form part of a separate electrically isolated branch or circuit of power system 11. As noted above, in some embodiments, the branch or circuit containing electrical energy storage device 50 may be a low-voltage branch or circuit, and the branch or circuit containing electrical energy storage device 48 may be a high-voltage branch or circuit. Power regulator 104 may serve as a bridge between the chassis referenced branch or circuit containing electrical energy storage device 50 and the other branch or circuit containing electrical energy storage device 48.

Machine 10 and power system 11 are not limited to the configurations shown in FIGS. 1 and 2 and discussed above. For example, the control tasks handled by power-system controls 26 may be distributed differently between controllers 112, 134, and 152 than discussed above. Additionally, power-system controls 26 may include various other configurations and/or arrangements for controlling the transmission of electricity between the various components of power system 11. Such other configurations of power-system controls 26 may include additional control components communicatively linked to one another and operable to share control tasks, such as other controllers, in addition to controllers 112, 134, and 152. Conversely, in some embodiments, power-system controls 26 may have a single controller in place of two or more of controllers 112, 134, and 152. Additionally, power-system controls 26 may include other numbers and/or configurations of power regulators, switching devices, and other components that transmit power between the power loads and power sources of power system 11. Power system 11 may also include different numbers and/or configurations of electrical energy storage devices than the examples discussed above. Additionally, electric motor 46 may serve a function other than rotating superstructure 20 around axis 34, such as moving other components of machine 10 or supplying mechanical power to propel machine 10. Furthermore, machine 10 may be any of a number of types of machines other than an excavator, including a stationary machine.

INDUSTRIAL APPLICABILITY

Machine 10 and power system 11 may have use in any application requiring power to perform one or more tasks. During operation of machine 10, power-system controls 26 may activate various electric loads to perform various tasks, such as activating electric motor 46 to rotate superstructure 20 around axis 34. Power system 11 may provide the electricity required to operate electric motor 46 and any other electric loads from various sources in various situations. Depending on the circumstances, power system 11 may provide electricity to electric motor 46 and the other electric loads from one or more of electric motor/generator 32, electric energy storage device 48, and/or electric energy storage device 50.

During much of the operation of machine 10, power system 11 may use electricity primarily from electric motor/generator 32 and/or primary electrical energy storage device 48 to supply the electricity needs of electric motor 46 and other large, high-voltage electrical power loads of power system 11. This may involve holding switching devices 136, 138 closed so that electrical energy storage device 48 can supply electricity to and receive electricity from power lines 110, 111 of inverter 100 to absorb fluctuations in the electricity requirements of electric motor 46 and other large, high-voltage loads connected to power lines 110, 111.

In various situations, primary electrical energy storage device 48 may have a charge level below desirable levels, and it may be desirable to charge the primary electrical energy storage device 48. For example, when machine 10 is initially constructed, the primary electrical energy storage device 48 may have little or no charge. Additionally, during operation of machine 10, an extended period of high electricity requirements by electric motor 46 and other large, high-voltage electric loads connected to power line 110, 111 may require the primary electrical energy storage device 48 to supplement electricity from electric motor/generator 32. This may ultimately discharge the primary electrical energy storage device 48 below a desirable charge level. Additionally, during extended periods of inactivity of machine 10 and power system 11, the primary electrical energy storage device 48 may discharge to undesirable levels.

When the primary electrical energy storage device 48 has an undesirably low charge level, various approaches may be used to charge it with electricity from power lines 110, 111, the secondary electrical energy storage device 50, and/or other electricity sources. Various factors may determine the best way to charge the primary electrical energy storage device 48. For example, the state of charge of the primary electrical energy storage device 48 may affect how much charging current it can safely accept. In some embodiments, if the charge levels of the individual storage cells in the primary electrical energy storage device 48 become imbalanced, it may be necessary at one or more stages of recharging the primary electrical energy storage device 48 to limit the magnitude of charging current supplied to the primary electrical energy storage device 48. This consideration may affect which electricity source should be used for charging because, as noted above, power regulators 102 and 104 may have different abilities to control electric current at very low magnitudes. Additionally, in some circumstances, it may not be possible to supply electricity from certain sources, which may also affect which source(s) should be used to charge the primary electrical energy storage device 50. Accordingly, various methods may be used for controlling what electricity source(s) are used in charging the primary electrical energy storage device 48. Such methods may involve manual and/or automatic control of the charging process.

Figure 3:
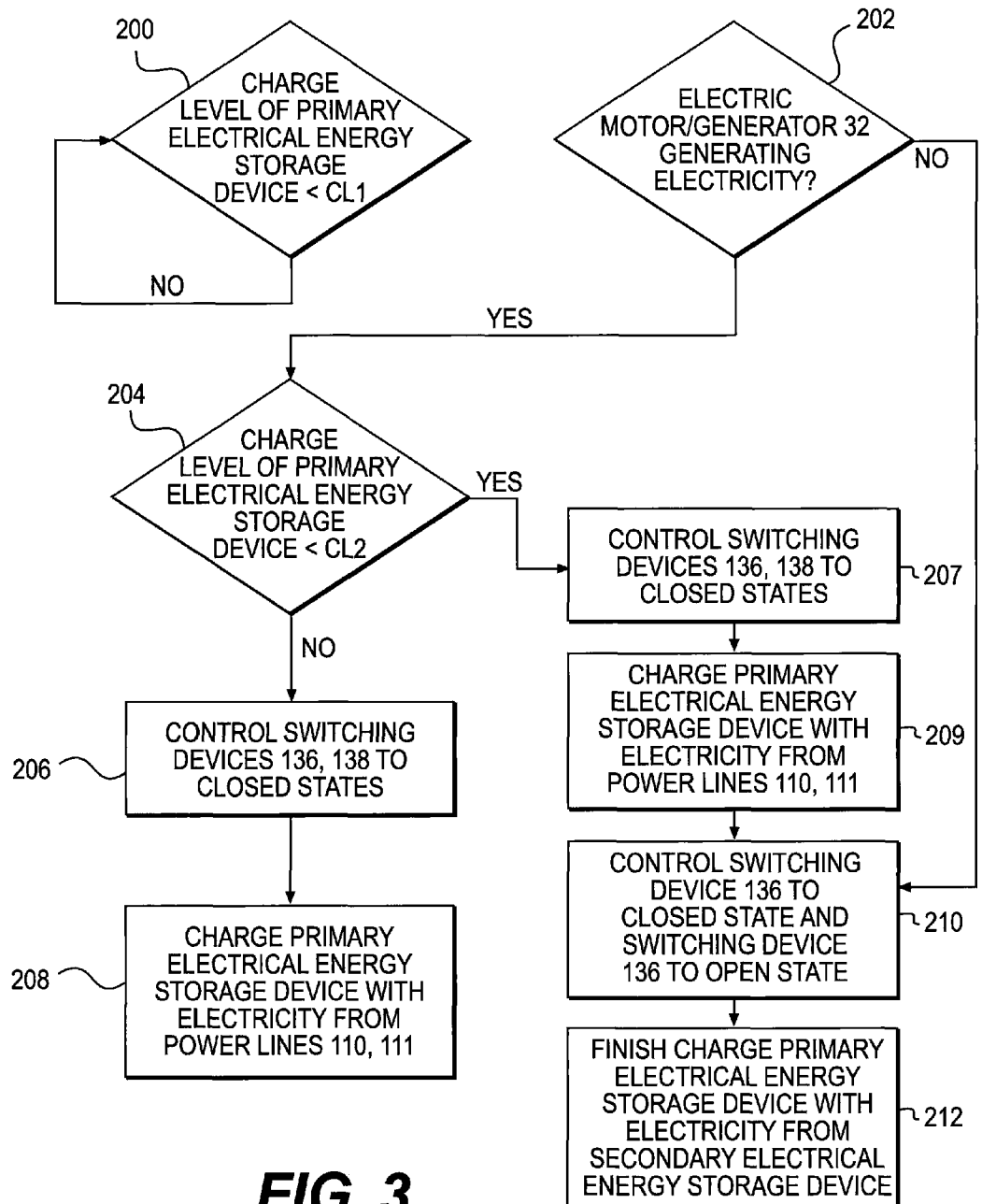
FIG. 3 is a flow chart illustrating one exemplary method of operating a power system according to the present disclosure.

FIG. 3 illustrates one example of an algorithm that power-system controls 26 may use for controlling charging of the primary electrical energy storage device 48 with electricity from power lines 110, 111 or the secondary electrical energy storage device 50. Power-system controls 26 may initially evaluate whether the state of charge of the primary electrical energy storage device 48 is such that it is desirable to charge it. As part of this determination, power-system controls 26 may determine whether the charge level of the primary electrical energy storage device 48 is less than a first reference charge level value CL1 (step 200). The first reference charge level value CL1 may correspond, for example, to a charge level that is diminished compared to a fully charged state but at which the primary electrical energy storage device 48 likely has balanced charge levels among its individual storage cells. The first reference charge level value CL1 may be expressed in a variety of ways, including a voltage level of the primary electrical energy storage device 48 or a percentage of full energy storage capacity. Thus, in an embodiment where the nominal voltage capacity of the primary electrical energy storage device 48 is about 350 volts, the first reference charge level value could be, for instance, 275 volts or 80% of full energy storage capacity. The first reference charge level value could be a fixed value, or it could be a value determined by power-system controls 26 based on other factors, such as the value of one or more sensed operating parameters of machine 10 and/or power system 11.

If power-system controls 26 determine that the charge level of the primary electrical energy storage device 48 is below the first reference charge level value CL1 and it is desirable to charge it, power-system controls 26 may evaluate what sources are available for charging. This may involve determining whether electric motor/generator 32 is generating electricity (step 202), such that electricity is available from power lines 110, 111 to charge the primary electrical energy storage device 48.

If electric motor/generator 32 is not generating electricity, power-system controls 26 may select the secondary electrical energy storage device 50 as a source for charging current. In connection with this, power-system controls 26 may electrically connect power regulator 104 to the primary electrical energy storage device 48 while electrically isolating power regulator 104 and the primary electrical energy storage device 48 from power regulator 102 and power lines 110, 111. Power-system controls 26 may do so, for example, by controlling switching device 136 to a closed state and switching device 138 to an open state (step 210). With the components so connected, power-system controls 26 may operate power regulator 104 to charge the primary electrical energy storage device 48 with electricity from the secondary electrical energy storage device 50 (step 212). This may involve controlling power regulator 104 to receive electricity from the secondary electrical energy storage device 50 via terminals 58, 60 and 126, 127 and supply electricity to the primary electrical energy storage device 48 via terminals 128, 129 and 54, 56.

Even if electric motor/generator 32 is generating electricity, it may be desirable in some circumstances to use the secondary electrical energy storage device 50 and the power regulator 104 for at least a portion of the process of charging the primary electrical energy storage device 48. For example, in some embodiments and circumstances it may be desirable to charge the primary electrical energy storage device 48 with a relatively low magnitude of precisely controlled electric current during at least a portion of the charging process, such as where the charge levels of the storage cells in the primary electrical storage device 48 have become imbalanced. In embodiments where power regulator 104 has the ability to precisely control electric current in small magnitudes, the secondary electrical energy storage device 50 and power regulator 104 may best meet the charging needs of the primary electrical energy storage device 48 in these and similar circumstances.

Accordingly, to determine if existing conditions suggest using the secondary electrical energy storage device 50 and power regulator 48 for one or more portions of the charging process, power-system controls 26 may evaluate whether circumstances exist that would indicate an imbalance between the charge levels in the individual cells of the primary electrical energy storage device 48. For example, power-system controls 26 may determine whether the charge level of the primary electrical energy storage device 48 has fallen below a second charge level reference value CL2 (step 204). The second charge level reference value CL2 may be less than the first charge level reference value CL1, and the second charge level reference value CL2 may be a value indicative of imbalanced charge levels among the individual cells in the primary electrical energy storage device 48. In embodiments where the nominal voltage capacity of the primary electrical energy storage device 48 is 350, the second charge level reference value may be, for example, 50 volts or 14% of the full energy storage capacity of the electrical energy storage capacity of the primary electrical energy storage device 48.

If power-system controls 26 identify circumstances indicative of imbalanced charge levels among the internal cells of the primary electrical storage device 48 (such as by determining that its charge level has fallen below the second reference charge level CL2), power-system controls 26 may select a charging method that involves using the secondary electrical energy storage device 50 and the power regulator 104 for at least a portion of the charging process. For example, power-system controls 26 may use electricity from power lines 110, 111 to perform some initial charging of the primary electrical energy storage device 48, followed by finish charging the primary electrical energy storage device 48 with electricity from the secondary electrical energy storage device 50 and power regulator 104. One example of how power-system controls 26 may do so will now be discussed in connection with FIG. 3. Power-system controls 26 may first control switching devices 136, 138 to their closed operating states to electrically connect terminals 118, 119 of power regulator 102 to terminals 54, 56 of the primary electrical energy storage device 48 (step 207). Power-system controls 26 may then operate power regulator 102 to receive from power lines 110, 111 electricity generated by electric motor/generator 32 and supply electricity to the primary electrical energy storage device 48 (step 209).

Power-system controls 26 may continue to charge the primary electrical energy storage device 48 with electricity from power regulator 102 until the primary electrical energy storage device 48 reaches a large percentage of its electrical energy storage capacity. However, before the primary electrical energy storage device 48 reaches full charge capacity, power-system controls 26 may cease charging the primary electrical energy storage device 48 with power regulator 102. Power-system controls 26 may then finish charging the primary electrical energy storage device 48 with electricity from the secondary electrical energy storage device 50. To do so, power-system controls 26 may control switching device 136 to a closed state and switching device 138 to an open state (step 210). With the components so connected, power-system controls 26 may operate power regulator 104 to charge the primary electrical energy storage device 48 with electricity from the secondary electrical energy storage device 50 (step 212). Thus, in response to circumstances where the charge level of the primary electrical energy storage device 48 is below both the first reference charge level value CL1 and the second reference charge level value CL2, power-system controls 26 may first perform some initial charging of the primary electrical energy storage device 48 with power regulator 102 and then switch to operating power regulator 104 to receive electricity from the secondary electrical energy storage device 50 and supply electricity to the primary electrical energy storage device 48 to finish charging it.

In operating power regulator 104 to finish charging the primary electrical energy storage device 48, power-system controls 26 and power regulator 104 may control the voltage and current magnitude of electricity supplied to the primary electrical energy storage device 48 in a number of ways. In some embodiments and circumstances, power-system controls 26 and power regulator 104 may receive electricity from the secondary electrical energy storage device 50 at a first voltage, such as approximately 12 or 24 volts, and regulate the electricity supplied to the primary electrical energy storage device 48 to a second voltage, such as approximately 350 volts. Additionally, in some embodiments and circumstances, power-system controls 26 and power regulator 104 may maintain the magnitude of electric current supplied to the primary electrical energy storage device 48 during finish charging below a reference current magnitude. The reference current magnitude may be a relatively low value, such as 10 amps, or even less than 100 milliamps. Maintaining the magnitude of the supplied electric current low may help ensure that the primary electrical energy storage capacitor 48 does not suffer damage due to excessively rapid charging with its internal cells having imbalanced charge states.

On the other hand, in circumstances where the primary electrical energy storage device 48 is discharged somewhat but has relatively even charge states among its internal cells, it may prove beneficial to charge it with electricity from power lines 110, 111, if available. This may allow more rapid charging of the primary electrical energy storage device 48 because power lines 110, 111 and power regulator 102 may be able to supply higher levels of power than the secondary electrical energy storage device 50 and power regulator 104. Accordingly, if electric motor/generator 32 is generating electricity (step 202) and the charge level of the primary electrical energy storage device 48 is below the first charge level reference value CL1 (step 200) but above the second charge level reference value CL2 (step 204), power-system controls 26 may select power lines 110, 111 as the source for charging electricity.

Upon doing so, power-system controls 26 may electrically connect power regulator 102 to the primary electrical energy storage device 48 by controlling both switching devices 136, 138 to closed operating states (step 206). With this connection in place, power-system controls 26 may control power regulator 102 to receive electricity from power lines 110, 111 and supply electricity to the primary electrical energy storage device 48, thereby charging the primary electrical energy storage device 48 with electricity from power lines 110, 111 (step 208). In doing so, power-system controls 26 may operate power regulator 102 to supply electricity with a current magnitude greater than the reference current magnitude used when supplying charging electricity from power regulator 104. For example, the electricity supplied from power regulator 102 to the primary electrical energy storage device 48 may, at least at times, exceed 10 amperes, or even 100 amperes. Thus, in response to circumstances where the charge level of the primary electrical energy storage device 48 is below the first reference charge level value CL1 but above the second reference charge level value CL2, power-system controls 26 may charge the primary electrical energy storage device 48 with electricity from power lines 110, 111 to provide rapid charging. In doing so, power-system controls 26 may use electricity from electric power lines 110, 111 to fully charge the primary electrical energy storage device 48.

While power-system controls 26 are operating to charge the primary electrical energy storage device 48, the primary functions of machine 10 and power system 11 may continue uninterrupted. For example, prime mover 30 may continue driving electric motor/generator 32 to supply electricity to power lines 110, 111 for use by electric motor 46 and other electrical power loads connected to power lines 110, 111. Similarly, the secondary electrical energy storage device 50 may continue supplying electricity to power loads 62. Thus, the charging of the primary electrical energy storage device 48 may be transparent to an operator of machine 10, as the machine 10 may continue operating during charging, rather than having to shut down for charging.

In addition to the foregoing, power-system controls 26 may employ power regulator 104 for various other purposes. For instance, in embodiments where power regulator 104 is operable to transmit electricity from terminals 128, 129 to terminals 126, 127, power-system controls 26 may operate power regulator 104 to transmit electricity from electrical energy storage device 48 to electrical energy storage device 50 in some circumstances. Power-system controls 26 may do so, for example, in some circumstances where electrical energy storage device 50 requires additional energy. Additionally, power-system controls 26 may operate power regulator 104 to transmit electricity from electricity from electrical energy storage device 48 to electrical energy storage device 50 for the purpose of discharging electrical energy storage device 50. In some circumstances, such as when machine 10 is being shut down, it may be desirable to discharge electrical energy storage device 48. By operating power regulator 104 to transmit electricity from electrical energy storage device 48 to electrical energy storage device 50, power-system controls 26 may be able to discharge electrical energy storage device 48 relatively quickly without need for various other discharging methods that may otherwise be used.

Additionally, power-system controls 26 may use power regulator 104 in preparation for closing switching devices 136, 138 in various circumstances. When switching devices 136, 138 are in open states, closing switching devices 136, 138 without incurring undesirable arcing across switching devices 136, 138 may require ensuring that the voltage at terminals 118, 119 of power regulator 102 is close to the voltage at terminals 54, 56 of electrical energy storage device 48. Accordingly, if it is desired to close switching devices 136, 138 and the voltage at terminals 118, 119 differs excessively from the voltage at terminals 54, 56, power-system controls 26 may activate power regulator 104 to change the voltage at terminals 118, 119 to be within a desired amount of the voltage at terminals 54, 56. For example, if the voltage at terminals 118, 119 of power regulator 102 is significantly lower than the voltage at terminals 54, 56 of electrical energy storage device 48, power-system controls 26 may operate power regulator 104 to receive electricity from electrical energy storage device 50 and supply electricity to terminals 118, 119 until the voltage at terminals 118, 119 is within a desired amount of the voltage at terminals 54, 56 of electrical energy storage device 48. Power-system controls 26 may then close both of switching devices 136, 138 without causing undesirable arcing across these switching devices 136, 138. The availability of power regulator 104 to adjust the voltage across switching device 136, 138 in this manner may obviate the need for other dedicated components (such as dedicated resistor circuits) that may otherwise be used for this purpose.

Methods of operating machine 10 and power system 11 are not limited to the examples discussed above and shown in FIG. 3. For instance, a method of determining which components to use to charge the primary electrical energy storage device 48 may use different values of the first and second reference charge levels CL1, CL2. Similarly, methods according to the present disclosure may use other criteria in addition to, or instead of, the first and second charge level reference values CL1, CL2. In some embodiments, power-system controls 26 may directly measure the charge states of individual cells in the primary electrical energy storage device 48 to evaluate whether they are imbalanced and, accordingly, how to charge the primary electrical energy storage device 48. Additionally, power-system controls 26 may perform the actions shown in FIG. 3 in different orders, perform one or more other actions in combination with those shown in FIG. 3, and/or omit one or more of the actions shown in FIG. 3.

The disclosed embodiments may provide a number of advantages. For example, the availability of secondary electrical energy storage device 50 and power regulator 104 on machine 10 to charge primary electrical energy storage device 48 when electric motor/generator 32 is not generating electricity may significantly increase the availability of machine 10 in many circumstances. Additionally, by monitoring one or more parameters (such as the charge level of the primary electrical energy storage device 48) and selecting which source of electricity to use in charging the primary electrical energy storage device 48, the disclosed methods may allow rapid charging when feasible and more gradual, controlled charging when rapid charging could cause damage.

It will be apparent to those skilled in the art that various modifications and variations can be made in the disclosed machine, power system, and methods without departing from the scope of the disclosure. Other embodiments of the disclosed machine, power system, and methods will be apparent to those skilled in the art from consideration of the specification and practice of the machine, power system, and methods disclosed herein. It is intended that the specification and examples be considered as exemplary only, with a true scope of the disclosure being indicated by the following claims and their equivalents.

What is claimed is:
1. A machine, comprising:
  a power system, including
    a prime mover drivingly connected to an electric generator;
    a power line operably connected to the electric generator;
    a first electrical energy storage device operable to exchange electricity with the power line;
    a second electrical energy storage device; and
  power-system controls, including
    a first power regulator; and
    at least one information processor configured to:
  receive information related to at least one operating parameter of the power system, wherein the information related to at least one operating parameter of the power system includes information related to a state of charge of the first electrical energy storage device, and control the first power regulator based on the received information, including selectively controlling the first power regulator to receive electricity from the second electrical energy storage device and supply the electricity to the first electrical energy storage device, wherein the at least one information processor is configured to automatically respond to first operating conditions by causing supply of electricity from the power line to the first electrical energy storage device to partially charge the first electrical energy storage device; and subsequently, controlling the first power regulator to receive electricity from the second electrical energy storage device and supply the electricity to the first electrical energy storage device to finish charging the first electrical energy storage device.

2. The machine of claim 1, wherein the at least one information processor is further configured to selectively cause supply of electricity from the power line to the first electrical energy storage device to fully charge the first electrical energy storage device in response to second operating conditions.

3. The machine of claim 2, wherein the at least one information processor is further configured for:

controlling the first power regulator to receive electricity from the second electrical energy storage device and supply the electricity to the first electrical energy storage device in response to the first operating conditions including maintaining an electric current magnitude of the electricity supplied from the first power regulator to the first electrical energy storage device below a first current value; and selectively causing supply of electricity from the power line to the first electrical energy storage device in response to the second operating conditions including selectively supplying electricity to the first electrical energy storage device at an electric current magnitude above the first current value.

4. The machine of claim 1, wherein:

controlling the first power regulator to receive electricity from the second electrical energy storage device and supply the electricity to the first electrical energy storage device includes maintaining an electric current magnitude of the electricity supplied from the first power regulator to the first electrical energy storage device below a first current value; and the at least one information processor is further configured to selectively cause supply of electricity from the power line to the first electrical energy storage device at an electric current magnitude above the first current value.

5. The machine of claim 1, wherein the power-system controls further include a second power regulator operable to regulate electricity exchanged between the power line and the first electrical energy storage device.

6. The machine of claim 1, wherein the at least one information processor is further configured to open a switching device to electrically isolate the first electrical energy storage device from the power line while controlling the first power regulator to receive electricity from the second electrical energy storage device and supply the electricity to the first electrical energy storage device.

7. A method of operating a power system of a machine, the power system including a prime mover, an electric generator drivingly connected to the prime mover, a power line, a first electrical energy storage device, a second electrical energy storage device, and a power regulator, the method comprising:

selectively supplying electricity to the power line, via a controller, by operating the engine to drive the electric generator and supply electricity from the electric generator to the power line;

selectively operating the power regulator, via a controller, to receive electricity from the second electrical energy storage device and supply electricity to the first electrical energy storage device, including maintaining the electric current magnitude of the electricity supplied from the power regulator to the first electrical energy storage device below a first current value;

selectively supplying electricity, via a controller, from the power line to the first electrical energy storage device at an electric current magnitude greater than the first current value, wherein selectively operating the power regulator to receive electricity from the second electrical energy storage device and supply electricity to the first electrical energy storage device includes operating the power regulator to receive the electricity from the second electrical energy storage device at a first voltage and supply the electricity to the first electrical energy storage device at a second voltage.

8. The method of claim 7, wherein the second voltage is higher than the first voltage.

9. The method of claim 7, further including:

monitoring with at least one information processor at least one parameter indicative of a state of charge of the first electrical energy storage device; and in response to first operating conditions related to the at least one parameter, charging the first electrical energy storage device by supplying electricity from the power line to the first electrical energy storage device to partially charge the first electrical energy storage device, and subsequently, operating the power regulator to receive electricity from the second electrical energy storage device and supply electricity to the first electrical energy storage device to fully charge the first electrical energy storage device.

10. The method of claim 7, further including:

monitoring with at least one information processor at least one parameter indicative of a state of charge of the first electrical energy storage device; and in response to the state of charge of the first electrical energy storage device being below a reference value, charging the first electrical energy storage device by supplying electricity, via the controller, from the power line to the first electrical energy storage device to partially charge the first electrical energy storage device, and subsequently, operating the power regulator, via the controller, to receive electricity from the second electrical energy storage device and supply electricity to the first electrical energy storage device to fully charge the first electrical energy storage device.

11. The method of claim 10, wherein:

the reference value is a second reference value; and selectively supplying electricity, via the controller, from the electric power line to the first electrical energy storage device includes supplying electricity from the electric power line to the first electric energy storage device to fully charge the first electrical energy storage device in response to second operating conditions, the second operating conditions including the state of charge of the first electrical energy storage device being above the second reference value but below a first reference value.

12. The method of claim 7, further including, while operating the power regulator, via a controller, to receive electricity from the second electrical energy storage device and supply electricity to the first electrical energy storage device, electrically isolating the first electrical energy storage device from the power line by holding a switching device open.

13. A machine, comprising:
a frame;
a movable component connected to the frame;
a power system, including
an electric motor drivingly connected to the movable component and operable to move the movable component relative to the frame,
an engine drivingly connected to an electric generator,
a power line connected between the electric generator and the electric motor, the power line being operable to transmit electricity between the electric generator and the electric motor,
a first electrical energy storage device operable to exchange electricity with the power line,
a second electrical energy storage device,
a power regulator, and
at least one information processor configured to receive information related to at least one operating parameter of the machine, wherein the information related to at least one operating parameter of the machine includes information related to a state of charge of the first electrical energy storage device, and control the power regulator based on the received information, including selectively controlling the power regulator to receive electricity from the second electrical energy storage device at a first voltage and supply the electricity to the first electrical energy storage device at a second voltage
wherein the at least one information processor is configured to automatically respond to first operating conditions by
causing supply of electricity from the power line to the first electrical energy storage device to partially charge the first electrical energy storage device; and
subsequently, controlling the first power regulator to receive electricity from the second electrical energy storage device and supply the electricity to the first electrical energy storage device to finish charging the first electrical energy storage device.

14. The machine of claim 13, wherein the at least one information processor is configured to receive information related to at least one operating parameter of the power system including information related to a state of charge of the first electrical energy storage device.

15. The machine of claim 13, wherein the at least one information processor is configured to control the power regulator to receive electricity from the second electrical energy storage device at the first voltage and supply the electricity to the first electrical energy storage device at the second voltage wherein the second voltage is higher than the first voltage.

16. The machine of claim 13, wherein:
the frame forms part of an undercarriage of the machine;
the movable component is a superstructure rotatable around an axis with respect to the undercarriage; and
the electric motor is operable to rotate the superstructure around the axis.

17. The machine of claim 1, wherein the at least one information processor is further configured to selectively control the first power regulator to receive electricity from the second electrical energy storage device and supply the electricity to the first electrical energy storage device including controlling the first power regulator to receive electricity from the second electrical energy storage device at a first voltage and supply the electricity to the first electrical energy storage device at a second voltage, the second voltage being higher than the first voltage.

* * * * *